United States Patent
Werther

[11] 3,841,785
[45] Oct. 15, 1974

[54] BORING BAR
[76] Inventor: Karl G. Werther, 1409 Hinnen Ave., Hacienda Heights, Calif. 93307
[22] Filed: June 9, 1972
[21] Appl. No.: 261,526

[52] U.S. Cl............ 408/197, 408/226, 408/240, 408/714
[51] Int. Cl............................. B23b 29/14
[58] Field of Search .......... 408/197, 240, 239, 238, 408/226, 714, 16; 29/96

[56] References Cited
UNITED STATES PATENTS

| | | | |
|---|---|---|---|
| 78,387 | 5/1868 | Manton | 29/96 |
| 605,422 | 6/1898 | Hardy | 408/240 X |
| 932,378 | 8/1909 | Ennis et al. | 29/96 |
| 1,219,097 | 3/1917 | Gibbs | 408/197 X |
| 1,423,209 | 7/1922 | Gibbs | 408/16 |
| 3,187,408 | 6/1965 | Titterud | 408/197 X |
| 3,546,759 | 12/1970 | Sirota | 29/96 |

FOREIGN PATENTS OR APPLICATIONS
593,812  10/1947  Great Britain ............ 408/239

Primary Examiner—Andrew R. Juhasz
Assistant Examiner—Z. R. Bilinsky
Attorney, Agent, or Firm—Lyon and Lyon

[57] ABSTRACT

A boring bar having a cylindrical body, the rearward portion of which is adapted to be held in a boring head. The forwardly extending portion of the bar has a longitudinal slot extending therethrough which terminates in a channel at the forward end of the bar. A boring bit is carried in the forwardly disposed channel and held therein by drawing the two sides of the bifurcated portion of the bar inwardly of the longitudinal slot.

6 Claims, 5 Drawing Figures

PATENTED OCT 15 1974 3,841,785

BORING BAR

BACKGROUND OF THE INVENTION

In general terms, a boring operation consists of a jig bore or boring machine turning a boring bar within a hole about either a central or eccentric axis. The boring bar carries a cutting or boring bit in its forward end, which bit is constructed of hard steel or carbide. The cutting edge of the bit is then directed about the cylindrical wall of the trough or hole, cutting and finishing the hole to exacting tolerances. The boring bars used in such an operation could be classified into two groups, one having an integral bar and bit, wherein the bit cut out is shaped on the forwardly extended end of the bar and those having replaceable bits. The latter group of boring bars carries the bits in the forward end of the bar and secures the bit by means of a pressing plate which is urged against the bit by a screw member. The use of a pressing plate to secure the boring bit in the bar prevents a sufficient reduction in the size of the boring bar for use in small blind holes, such as those under a quarter of an inch. Therefore, in boring out small holes, it is necessary to use an integral bar and bit. The disadvantage of such a bar is that breakage or damage to the bit necessitates replacement of the entire bar.

A second problem associated with both classes of conventional boring bars is that of vibration. Because the boring tool is used to cut to extremely small tolerances any vibration in the bar necessarily limits the precision of the cutting operation.

It is therefore the principal object of this invention to provide an improved boring bar.

It is another object of this invention to provide a boring bar with a replaceable bit which is adaptable for use in smaller areas than the boring bars heretofore available.

It is further an object of this invention to provide a boring bar which undergoes less vibration during the boring operation than boring bars heretofore available.

It is still a further object of this invention to provide an improved boring bar which is adapted to carry conventional boring bits.

These and other objects and advantages of the present invention will become apparent from the following detailed description taken in conjunction with the accompanying drawings.

SUMMARY OF THE INVENTION

Briefly, the invention consists of a cylindrical body member having a forwardly extending portion which carries a boring bit near the end thereof in a channel which is angled with respect to the body member and extends therethrough. A longitudinal slot bifurcates a section of the forwardly extending portion and terminates in the angled channel, thereby providing two surfaces which can be pressed together by means of a small allen screw or the like to secure the cutting bit.

IN THE DRAWINGS

Figure 1:
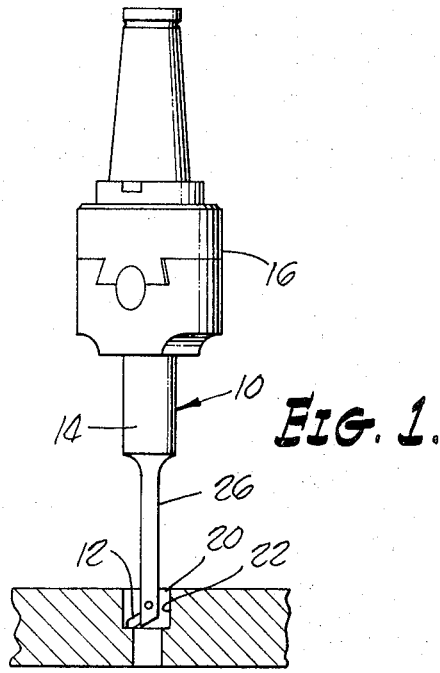
FIG. 1 is a plan view of a boring operation showing the boring bar mounted in a boring machine and boring out a hole about eccentric axis.
Figure 2:
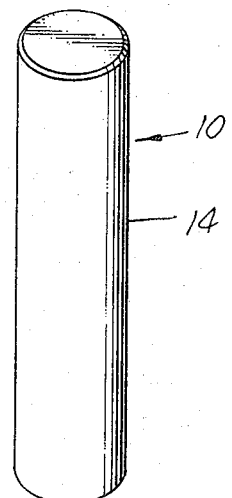
FIG. 2 is an isometric elevation of the boring bar with the boring bit and securing nut extended therefrom.

Referring now in detail to the drawings, the boring operation is shown in FIG. 1, where the boring bar 10 has a boring bit 12 secured in the lowermost end thereof, while the upper base 14 of the bar 10 is mounted in a boring head 16 which in turn is carried by jig bores or a boring machine (not shown). The boring machine then rotates the boring bar 10 about the central axis of hole 20 which is being bored and also about the central axis of the boring bar 10, thereby exactly following the cylindrical wall 22 of the hole, while maintaining the cutting edge 24 of the bit (see FIG. 4) in continual contact therewith.

Figure 3:
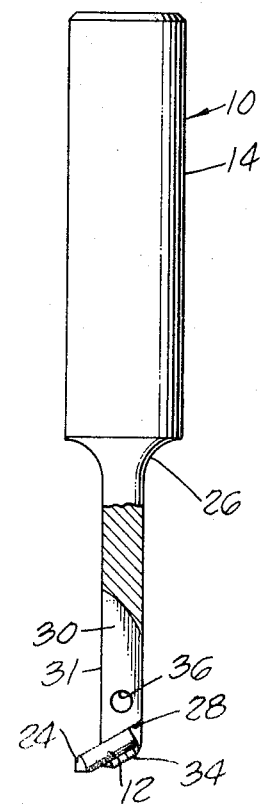
FIG. 3 is a plan view of the boring bit with the lower portion thereof broken away.

The boring bar 10 has a cylindrical body defining a base portion 14 and a forwardly extending portion 26. As shown in FIGS. 1–4, the forwardly extending portion 26 is of a reduced cross sectional area, which is illustrative of the boring bars used for work in smaller holes. With larger bars, such as that shown in FIG. 5, the bar is of fairly uniform cross sectional area, as the wide forwardly extending portion of such a bar would not interfer with the boring of the larger hole. The forward end of the forwardly extending portion 26 has a cylindrical channel 28 therein which extends through the forward portion and is angularly disposed with respect thereto, as shown in FIG. 3. The angularly disposed channel 28 is adapted to hold the boring bit 12 therein. As noted above, the boring bit has a cutting edge 24 thereon which is located at the extended edge thereof to be in continual contact with the wall of the hole being sized thereby.

Figures 4, 5:
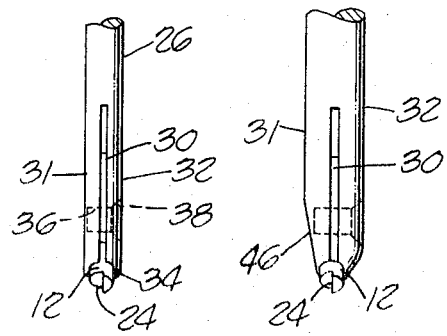
FIG. 4 is an elevation of the forwardly extending portion of the boring bit, showing the relation of the longitudinal slot, boring bit and securing nut.
FIG. 5 is an elevation of the forwardly extending portion of a boring bit for use in larger holes.

The longitudinal slot 30 is cut through the forwardly extending portion 26 of the boring bar from a point below the base portion 14 and extending to channel 28, thereby bifurcating that length of the forward portion 26 of the bar into two pressing members 31 and 32, which are joined together in an angled wall portion 34 about channel 28. The angled wall 34 is the forward most portion of the boring bar 10. As shown in the drawings, the upper end of the slot 30 extends at an angle with respect to to the bar. This is solely a result of a manufacturing technique and does not affect the functioning of the longitudinal slot. An aperture 36 is positioned in the forward portion 26 of the boring bar above channel 28 and extending through pressing members 31 and 32, perpendicular to the longitudinal slot 30 therebetween. Aperture 36 has an enlarged head portion 38 in pressing member 30 and a threaded body portion in pressing member 31, which are adapted to receive a threaded allen screw 42 having an enlarged head portion 44. When the boring bit 12 is placed within channel 28 and screw 42 tightened within aperture 36, the enlarged head portion 44 of the screw draws the two pressing members 31 and 32 together about the channel 28 reducing the radial arch of channel wall 34 and securing the boring bit 12 within the boring bar 10. In addition to defining pressing members 31 and 32 which are drawn together to secure the boring bit 10, the longitudinal slot 30 in the forwardly extending portion 26 of the boring bar has also been found to reduce vibration in the boring bar during the boring process, thereby further increasing the precision of the boring process. Finally, in the larger bars, as shown in FIG. 5, a recessed area 46 is provided in the forwardly extending portion of the bar to allow the metal chip flow outwardly of the cutting area.

Various changes and modifications may be made in carrying out the present invention without departing from the scope and spirit thereof. Insofar as these changes and modifications are within the purview of the appended claims they are to be considered as part of the invention.

I claim:

1. A boring bar for mounting in a boring machine and adapted to carry a boring bit comprising a cylindrical body member having a forwardly axially extending portion, said forwardly axially extending portion having a longitudinal axis, a continuous end portion and a transverse channel extending therethrough, said channel being positioned adjacent to and enclosed by the continuous end portion of said forwardly extendingly portion and being adapted to hold said boring bit therein, a slot parallel to and passing through the longitudinal axis of said forwardly extending portion and extending from the upper portion thereof proximate said cylindrical body member to said channel and merging therewith and means for compressing said forwardly extending portion about said slot thereby maintaining said bit within said channel, said means being positioned rearwardly of said channel along said forwardly extending portion.

2. The combination of claim 1 wherein said compressing means comprises an aperture in said forwardly extending portion, said aperture being substantially perpendicularly disposed with respect to said longitudinal axis of said forwardly disposed portion and screw means adapted to be positioned within said aperture and for threaded engagement with said forwardly extending portion of said body member whereby upon turning said screw means positioned within said aperture, said forwardly extending portion is compressed about said slot.

3. The combination of claim 1 wherein the portion of said aperture being disposed on one side of said slot is adapted for threaded engagement with said screw means, the portion of said aperture being disposed across said slot from said first portion having an enlarged head portion and said screw member having an enlarged head portion, said head portion of said screw member being adapted to be positioned within said enlarged head portion of said aperture.

4. A boring bar for mounting in a boring machine and adapted to carry a boring bit comprising a cylindrical body member having a forwardly axially extending portion, said forwardly axially extending portion having a longitudinal central axis, a continuous forward most end portion and a channel extending therethrough adapted to hold said boring bit therein, said channel being positioned adjacent the forwardmost end of said forwardly extending portion and making an obtuse angle with respect to the central axis of said forwardly extending portion, a slot parallel to and passing through the longitudinal axis of said forwardly extending portion and extending from the upper portion thereof to said channel and merging therewith, said slot bifurcating a portion of said forwardly extending portion into a pair of pressing members, said pressing members being joined at their forwardmost end in a continuous wall of said angularly disposed channel, an aperture in said forwardly extending portion extending substantially through said press member and being perpendicularly disposed with respect to said longitudinal axis of said forwardly extending portion, screw means adapted to be positioned within said aperture and for threaded engagement with said forwardly extending portion whereby upon tightening said screw means, said pressing members are drawn together inwardly of said slot and about said channel, reducing the internal diameter of said channel and thereby securing said bit within said channel and a recessed area in the external surface of said forwardly extended portion of said body member by which metal chips may pass during the boring operation.

5. The combination of claim 4 wherein the portion of said aperture in one of said pressing members is adapted for threaded engagement with said screw member, the portion of said aperture positioned within said other pressing member having an enlarged portion thereof and said screw member having an enlarged head portion, said enlarged head portion being adapted to be positioned within said enlarged portion of said aperture.

6. The combination of claim 1 including a recessed area in the external surface of said forwardly extending portion of said body member by which metal chips may pass during the boring operation.

* * * * *